UNITED STATES PATENT OFFICE.

JACK CHURCHWARD, OF NEW YORK, N. Y., ASSIGNOR TO WILSON WELDER & METALS COMPANY, INC., A CORPORATION OF NEW YORK.

METALLIC ARC WELDING.

1,403,230. Specification of Letters Patent. Patented Jan. 10, 1922.

No Drawing. Application filed February 12, 1920. Serial No. 358,191.

*To all whom it may concern:*

Be it known that I, JACK CHURCHWARD, a citizen of the United States, and a resident of the city, county, and State of New York, have invented certain new and useful Improvements in Metallic Arc Welding, of which the following is a specification.

My invention relates to electric arc welding, and particularly to that type of welding known as "metallic-arc welding" wherein the metal to be deposited is supplied from the electrode itself.

One object of my invention is to produce a simple and efficient method of depositing metal from one metallic electrode upon another, in such a manner that the deposit will have a definite predetermined chemical composition. Another object is to produce a method of securing metallic deposits of any desired composition with great accuracy, rapidity and cheapness.

Hitherto in metallic-arc welding, whenever a deposit of metal of a definite and predetermined composition was desired, it was found necessary to prepare an electrode of a special composition corresponding closely to the composition desired in the deposit, and generally the metal for the "special" electrode had to be cast especially for each particular welding "job." It was known, moreover, that when welding, due to the intense heat of the arc, the ingredients of the electrode as they passed therethrough were partially oxidized and volatilized. Hence, in order to compensate for the consequent loss of metal in the arc, or "arc-loss," it became necessary to employ electrode alloys having an excess of those ingredients most liable to be oxidized or volatilized in the arc. This was true not only when welding with alloy steel, but also when welding with ordinary carbon steel. The estimation of the exact excess of the oxidizable or volatile ingredients to be employed in the electrode alloy for exactly compensating for the loss in the arc was a difficult matter; and it was still more difficult to accurately manufacture an electrode having such an estimated composition, predetermined upon.

I have discovered a method of metallic-arc welding whereby the above mentioned objects may be attained and by which the former difficulties may be largely obviated. In carrying out my invention in the manner now to be described, it is not necessary that an electrode be "specially" prepared, but I prefer to employ an electrode having a composition which roughly approximates that of the desired deposit, and I control the deposit of metal by providing this electrode with a uniform compensative outer coating of ingredients adapted to enter the weld.

I will now proceed to describe one example of the many possible uses to which my invention may be put.

Example: It was desired to deposit metal by the metallic-arc welding method upon a steel plate having the following chemical composition: carbon .50%, manganese .50%, phosphorous .018%, sulphur .023%, silicon .03% and iron 98.929%. According to my improved method a round electrode having a diameter of .148 inches and having the following chemical composition was employed: carbon .40%, manganese .75%, phosphorous .018%, sulphur .023%, silicon .08% and iron 98.729%. As will be noted, the metal of this electrode was deficient in carbon. In order to replenish or compensate for this deficiency, the electrode was coated in the following manner: A suspension composed of equal parts of finely divided graphite and an aqueous solution of sodium silicate (1.7 sp. gr) was painted upon the exterior of the electrode until a uniform coating of about $\frac{1}{32}$ of an inch in thickness was obtained. It was unnecessary to coat the electrode with any of the other ingredients liable to be oxidized or volatilized in the arc (manganese and silicon in this instance) because the percentage of these other ingredients exceeded the desired percentage in the deposit by an amount which had previously been found by experiment to be exactly sufficient to compensate for the loss in the arc. In depositing the metal upon the plate, according to the present illustrative example, the welding apparatus employed was of the type such as was described in the patent to D. H. Wilson, No. 1,187,408, granted June 13, 1916. The welding operation was carried out at a uniform amperage of about 130 and an I. R. drop through the arc of from 13–23 volts. The resulting weld deposit was analyzed chemically and it was found that it had almost identically the composition which had been predetermined, i. e., that of the steel plate (see above). As will be evident, the deficiency of carbon in the original electrode as well as the additional loss of carbon therefrom due to "arc loss", was entirely replenished from the graphite contained in the electrode coating. The exact composition of the electrode coating and the thickness of the coating will vary considerably under different welding conditions. Before utilizing my invention, therefore, especially when extremely accurate results are desired, a simple preliminary experiment may be made to determine the composition and thickness of the coating which will be the most efficient for use in conjunction with the particular electrode employed. A second coating of a "weld regulating substance" such as an aqueous solution of plain sodium carbonate or even lime may be applied upon the outside of the electrode, if desired. The use of this second coating increases the efficiency of the method somewhat, but is not absolutely essential to its successful operation. I do not desire to be limited to the use of sodium silicate as a binder for holding the compensative ingredients upon the electrode, for it is obvious that other adhesive materials having similar characteristics may be substituted therefor by persons skilled in the art, without invention.

Furthermore, my invention is obviously not limited to the introduction of carbon into a weld, as in the above illustrated example, but other ingredients such as non-ferrous metals or mixtures of metals may be introduced into weld deposits in place of carbon or in combination therewith. Among the metals which I have succeeded in introducing successfully into steel welds, according to my improved method, are manganese, tungsten and nickel.

From the above detailed description of my invention, it will be evident that I have produced an improved method of metallic-arc welding by which it is possible to control the physical and chemical properties of a deposit of metal almost at will.

I desire it to be understood that my invention is not to be limited to the specific examples herein disclosed but it may be practiced in various other ways within the scope of the following claims:

I claim:

1. An electrode for electric arc welding having a uniform homogeneous outer coating consisting of a mixture of carbon and a silicate binder.

2. An electrode for welding iron or steel alloys by the metallic-arc method, said electrode being coated with a suspension of finely divided graphite in a solution of sodium silicate.

3. An electrode for welding iron or steel alloys by the metallic-arc method, said electrode being coated uniformly with a suspension of finely divided graphite in a solution of sodium silicate.

4. The method of preparing a steel alloy of a definite predetermined composition which comprises: preparing an aqueous solution of sodium silicate, suspending finely divided graphite in said solution, applying a coating of said suspension upon the exterior of a steel electrode deficient in carbon, and depositing metal upon a second electrode by causing an electric arc to be maintained between said electrodes.

In testimony whereof, I have affixed my signature to this specification.

JACK CHURCHWARD.